(12) United States Patent
Szabo et al.

(10) Patent No.: US 6,180,555 B1
(45) Date of Patent: Jan. 30, 2001

(54) ACID CATALYST WITH A SULFATED ZIRCONIA BASE AND ITS USES

(75) Inventors: Georges Szabo, Montivilliers; Pedro Nascimento, Le Havre; Alain Milan, Montivilliers; Sebsastien Decker, Le Havre, all of (FR)

(73) Assignee: Total Raffinage Distribution S.A., Puteaux (FR)

( * ) Notice: Under 35 U.S.C. 154(b), the term of this patent shall be extended for 0 days.

(21) Appl. No.: 09/168,920

(22) Filed: Oct. 9, 1998

(30) Foreign Application Priority Data

Oct. 13, 1997 (FR) .................................................. 97 12762

(51) Int. Cl.$^7$ .................................................. B01J 27/053
(52) U.S. Cl. .......................... 502/217; 502/218; 502/219; 502/220; 502/221; 502/222; 502/223
(58) Field of Search ..................................... 502/217, 218, 502/219, 220, 221, 222, 223

(56) References Cited

U.S. PATENT DOCUMENTS

| | | | |
|---|---|---|---|
| 4,918,041 | * | 4/1990 | Hollstein et al. ..................... 502/217 |
| 5,113,034 | | 5/1992 | Soled et al. . |
| 5,191,139 | | 3/1993 | Sanderson et al. . |
| 5,629,257 | * | 5/1997 | Umansky et al. .................... 502/217 |
| 5,780,383 | * | 7/1998 | Hollstein et al. ..................... 502/324 |

FOREIGN PATENT DOCUMENTS

| | | |
|---|---|---|
| 504 741 | 9/1992 | (EP) . |
| 520 543 | 12/1992 | (EP) . |

* cited by examiner

Primary Examiner—Elizabeth D. Wood
(74) Attorney, Agent, or Firm—Sughrue, Mion, Zinn, Macpeak & Seas, PLLC

(57) ABSTRACT

The invention relates to an acid catalyst containing a substantial quantity of supported or mass sulfated zirconia and at least one hydrogenating transition metal. This catalyst is characterized by the fact that the sulfated zirconia is in crystallized form and that it shows a specific surface area greater than or equal to 150 m$^2$/g, a pore volume greater than or equal to 0.20 cm$^3$/g and an average pore diameter greater than or equal to 20 Angstroms ($20 \times 10^{-10}$ m). The invention also relates to methods of making this catalyst and to the uses of this catalyst in hydrocarbon transformation chemical reactions requiring the use of an acid type catalyst, such as for example, isomerization, alkylation, oligomerization reactions or even light hydrocarbon dehydration reactions, and also heavier hydrocarbon hydrocracking and hydroisomerization reactions.

40 Claims, No Drawings

ACID CATALYST WITH A SULFATED ZIRCONIA BASE AND ITS USES

This invention relates to an acid catalyst that contains a substantial amount of sulfated zirconia and at least one hydrogenating transition metal as well as to its uses in hydrocarbon transformation chemical reactions requiring the use of an acid type catalyst, such as for example those of isomerization, alkylation, oligomerization or yet dehydration reactions of light hydrocarbons, but also hydrocracking or hydroisomerization reactions of heavier hydrocarbons.

In the following, the term "sulfated zirconia" does not mean zirconium sulfate or zirconyle stoichiometric sulfate, but zirconium (zirconium dioxide) more or less sulfated, where the sulfate content can be less than that of the above-mentioned stoichiometric compounds.

As known, the oil industry uses many methods to modify hydrocarbon structures in order to obtain molecules whose properties are suitable for the sought use. These procedures usually call for one or more catalysts that have to be specifically adapted to the chemical transformation one wants to complete, as well as to the requirements tied to the implementation of the method.

Many of these hydrocarbon transformation chemical reactions are done with an acid type catalyst. Such is the case, for example, of reactions talking place in the isomerization process of paraffin, which applies mostly to light gasolines and allows for the transformation of linear paraffin into ramified paraffin, whose octane number is higher.

In this method, the acid catalysts most used today are catalysts with an aluminum chloride base supported on alumina (meaning deposited on an alumina support). Indeed, these extremely active catalysts make it possible to obtain an isomerization reaction at low temperatures, around 150° C., with a thermodynamic balance that is very favorable to the formation of the sought products.

However, this type of catalyst does have a certain number of inconveniences tied in particular to the fragile nature of its active sites. Indeed, the aluminum chloride is a very unstable compound: it is irreversibly destroyed by water, oxygen, oxygen-containing or sulfur compounds. These products must therefore be entirely eliminated from the load being treated, which is quite costly and restricting. Furthermore, the loading of the reactors when starting the unit or, when the catalyst has been replaced, must be done in perfectly anhydrous conditions, without any trace of water or oxygen. Moreover, the preservation of the active sites during the operation requires a constant injection of dopants such as hydrochloric acid or other chlorine products; the excess acid must then be removed when leaving the reactor and invariably creates a corrosion problem. Lastly, despite all these precautions, the catalyst is progressively destroyed and must be replaced periodically since it is not regenerable.

This is why the research relating to acid catalysts has looked to the creation of new compounds with catalytic properties similar to those of the aluminum chloride but without having the same inconveniences as the latter. This is specifically the case of the sulfated zirconia.

Thus, U.S. Pat. No. 3,032,599 (Phillips Petroleum) is one of the first patents to describe the application of sulfated zirconia to isomerization and alkylation of hydrocarbons: the proposed catalysts are made entirely of zirconia gel, possibly containing small quantities of a metallic promoter. They are prepared by the precipitation of a zirconyle salt in solution in water, by an addition to the base. The zirconia gel obtained is then sulfated and then activated at approximately 500° C. These catalysts do indeed show acid catalytic properties but, however, they are not very satisfactory. Indeed, they have a low surface area which can explain their relatively mediocre performance as far as isomerization reactions are concerned. Furthermore, these powdery catalysts are for the most part unusable as such in an industrial reactor.

Also, U.S. Pat. No. 3,132,110 (Union Oil) describes the properties of a series of acid catalysts with a base of hydrated zirconia containing sulfate radicals, pure or preferably combined with alumina. The preparation methods of these catalysts rest mostly on the decomposition of a zirconia sulfate salt in solution in water, by the hydrolysis in a basic medium or by thermal decomposition. The catalysts obtained in this manner are indeed active in a good number of reactions requiring the use of an acid catalyst, and have the advantage of being perfectly regenerable. Nevertheless, their activity has proved to be relatively limited and these catalysts must be used at high temperatures, for example over 370° C. in the case of the isomerization reaction of paraffin. Well, at such temperatures, not only is this reaction disadvantaged thermodynamically but, in addition, the catalyst's deactivation speed is accelerated by depositing coke on its surface.

Along the same lines of replacing aluminum chloride based catalysts in isomerization with more stable catalytic compounds, U.S. Pat. No. 4,406,821 (Exxon) proposes a catalyst consisting of a sulfated oxide deposited on an alumina support. This oxide is preferably a tungsten or hafnium oxide, but can also be a niobium, thallium, zirconium oxide, or a mixture thereof. This catalyst is prepared by impregnation of the alumina support with a solution of a salt of the chosen metal, followed by a calcination at a high temperature then a sulfation using a sulfuric acid water solution. The catalyst obtained by this method does possess the acid properties and it performs particularly well in the etherification reactions of phenols. Nevertheless, these catalysts are not well adapted to the isomerization reaction of paraffin at low temperatures, where their activity seems to be limited.

In general, the acid catalysts proposed in the prior art and which could replace the alumina chloride based isomerization catalysts are therefore quite unsatisfactory due to their lack of activity.

Continuing her research in the field of sulfated zirconia based catalysts, the petitioner has issued the hypothesis that the lack of activity of the formulas proposed to date was tied to the actual structure of these catalysts that do not present enough accessible active sites to the reactive molecules. She has deduced that is was due to a maladjusted porosity and to a catalyst surface area too small in the prior art's catalysts, in our incapacity in controlling these paraineters.

This is why the petitioner has focused her efforts on the problem, at the time unsolved, of improving the exchanges between the active catalyst sites and the molecules to be converted. She assumed it was necessary to succeed in modifying the structure of these sulfated zirconia based catalysts, and she then focused on creating catalysts that have a more adequate porosity and surface area, appropriate for giving them a better activity compared to what has been accomplished to date. In doing so, she has also discovered a certain number of original methods for controlling the porosity of these catalysts and shaping them so as to obtain the desired active structures.

So, the applicant has perfected a solid acid catalyst, containing a substantial quantity of supported or mass sulfated zirconia and at least one hydrogenating transition metal. This catalyst is different in that the said sulfated zirconia is in a crystallized form and shows a surface area greater than or equal to 135 m$^2$/g, a pore volume greater than or equal to 0.16 cm$^3$/g, and an average pore diameter greater than or equal to 20 Angstroms (20, 10$^{-10}$ m).

Here and in the following, the characteristics of the surface area, the pore volume and the average pore diameter are mentioned in reference to the method of determination called B. E. T. (Brunauer, Emmett, Teller) by adsorption of nitrogen, well known to any person skilled in the art, as described in the work by S. Lowell and J. E. Shields, "Powder surface Area and Porosity", Powder Technology Series (1984). The surface area S is deducted from the B.E.T. linear transformation at five points, the pore volume Vp is determined according to the quantity of nitrogen absorbed in a relative pressure P/Po=0.985 and the average pore diameter Rp is calculated following the formula Rp=2Vp/S.

In the catalyst consistent with the present invention, the zirconia (zirconium dioxide) is partially or totally sulfated. Favorably, the sulfate content is less than the stoichiometric quantities: preferably, the sulfur content in form of sulfate is between 1% and 10% by weight compared to the weight of the zirconia, and even more preferably, between 1% and 5% by weight.

According to the invention, the structure and texture characteristics that define the catalyst have been optimized by acting on the manufacturing method of these catalysts: by resorting to adequate methods such as the deposit of sulfated zirconia on an appropriate support or the potential use of a structuring agent, by acting both on the nature and the sequence of the manufacturing stages of these catalysts, by implementing appropriate thermal treatments (in particular, calcinations), it has been possible to modify the structure and the texture of sulfated zirconia based catalysts in order to select the most active formulas.

When compared to the sulfated zirconia based catalysts known to date, the catalyst according to the invention shows a crystalline structure that helps give it a more open porosity, and a higher specific surface area. This generates a better ease of access for the reactants to active sites that are themselves more numerous, which, in turn, gives the catalyst an increased activity: for the isomerization reaction of linear paraffin, it has been proved to possess an activity close to that of traditional alumina chloride based catalysts. As the latter, the invention's catalyst stays active at low temperatures (approximately 150° C.), thus in conditions for which the isomerization reaction of linear paraffins is thermodynamically favorable to the sought ramified products.

Furthermore, even though the invention's catalyst has catalytic properties similar to those of traditional aluminum chloride catalysts, it does not have the same disadvantages: much more stable, it has indeed proved to be less sensitive to the inevitable presence of small quantities of water and sulfur compounds in the loads to be converted. Indeed, the water does not act on the catalyst's active sites in a destructive manner but in an inhibitory manner, and thus in a reversible manner, since this catalyst can easily be regenerated. In the same manner, there is no need for any specific precautions to be taken when storing and loading this catalyst.

Also, the invention's catalyst has the undeniable advantage of being perfectly regenerable, by the combustion of coke deposits created during the isornerization reaction. This property is particularly interesting from an economic point of view considering the high cost of catalysts. The regeneration can be handled advantageously on site, meaning without having to remove the catalyst from the reactor, which avoids the multiplication of unloading and loading functions of the latter.

It is then possible to consider a continuous catalyst regeneration method, where the catalyst circulates between a reactor in which the conversion takes place and a catalyst regeneration chamber. Such a method avoids having to periodically stop the unit in order to regenerate the catalyst and more importantly to have, in the reactor, a catalyst permanently kept at the height of its activity.

Furthermore, the use of the invention's catalyst does not require the injection of corrosive dopants in the reactor. As a result, the corrosion is reduced within the unit which in turn allows for a longer life time of the unit. It also results in an enhancement of the security tied to the method, and in particular to a reduction of pollution and accident risks connected with the use of such dopants, especially the toxic dopants.

Lastly, the invention's catalyst has proved to be remarkably active in a certain number of reactions other than the isomerization of light paraffin. Among others, the alkylation reactions, the dehydration reactions, and mostly the hydrocracking and hydroisomerization reactions of longer light paraffins (consisting of more than 7 carbon atoms).

Concurrently, the petitioner has perfected several original methods allowing for the control of both the structure and the texture of the sulfated zirconia based catalysts, and therefore for the preparation of a catalyst with a controlled porosity as described previously. Thus the invention also relates to these preparation procedures, which will be explained in more detail in the description and the examples hereafter.

In order for the catalyst to be sufficiently active, the sulfated zirconia that it contains must be in a crystallized form, meaning is must not be in an amorphous form. The preferred crystallized structure are the quadratic and monoclinic type structures. The determination of the crystalline structure of the zirconia is created, in a well known manner, by x-ray diffraction.

The presence of a hydrogenating transition metal is necessary for the stability of the catalytic activity of the invention's catalyst. This hydrogenating transition metal is preferably an element pertaining to group VIII of the Periodic table of the elements, and in particular an element of the group consisting of platinum, ruthenium, rhodium, palladium, osmium and iridium, where the platinum is most preferred. The crystalline structure of the zirconia is not affected in a sensitive manner by the presence of this hydrogenating transition metal.

The acid catalyst, according to the invention, is of the solid type. It can exist under all forms to which the trades person usually resorts for the implementation of solid catalysts, and in particular in the form of particles such as beads, extrusions, and pellets. It has a visible filling density preferably between 0.5 and 3.

Preferably, its surface area is greater than or equal to 150 m$^2$/g, its pore volume is greater than or equal to 0.2 cm$^3$/g and its average pore diameter is greater than or equal to 30 Angstroms (30.10$^{-10}$ m).

The crystallized sulfated zirconia present in the invention's catalyst can have two distinct forms: one called "supported" or another called "mass".

In the case of a crystallized sulfated based zirconia in the supported form, the sulfated zirconia crystals are deposited on a support that has already formed. The latter can be any kind of support usually used for industrial catalysts, such as alumina, silica, silica-alumina, silicate, alumino-silicate, magnesia, zeolite, active carbon, gallium, titanium, thorium, or boron oxide, clay and any combination of these supports. Preferably, the invention's catalyst then contains between 50% and 95% by weight of classic support, on which 5% to 50% of sulfated zirconia by weight is deposited.

In the case of a crystallized sulfated zirconia based catalyst in mass form, such catalyst contains zirconia crystals in its matrix, alone or mixed with a structuring agent, which allows for a better control of the catalyst's structure and texture and facilitates its shaping, considering the powdery characteristic of the zirconia. This structuring agent can be any refractory mineral oxide usually used in the industry, and can in particular be chosen from the group consisting of aluminas, silicas, silica-alurninas, alumino-silicates, clays and combinations of these compounds. The catalyst can then contain from 0.5 to 100 percent by weight of the sulfated zirconia and preferably from 20 to 80 percent by weight.

The invention's acid catalyst can be prepared according to a certain number of methods detailed here-after. These methods make it possible to have a strong control of the textural and structural properties of the catalyst, which is indispensable in preparing a catalyst that satisfies the characteristics of the invention, thus a highly active and usable catalyst as is in an industrial reactor.

a) Supported sulfated zirconia based catalyst

The solid acid catalyst, with a sulfated zirconia base, deposited on a catalytic support can be prepared according to a method consisting of the following steps:
   deposit of hydrated zirconia on the catalytic support
   calcination of the solid
   sulfation of the solid
   deposit of a hydrogenating transition metal
   final calcination of the solid.

The deposit of the hydrated zirconia on the catalytic support can be done by impregnation of the mentioned support through a solution of zirconium salt followed by drying the solid obtained.

The deposit of a hydrogenating transition metal on the catalytic support can be done before the deposit of zirconia or at any other time during the preparation but must be done prior to the final calcination.

b) Mass sulfated zirconia based catalyst

In these catalysts, the matrix has a base of zirconia, pure or mixed with a structuring agent containing a refractory mineral oxide base or a mixture of refractory mineral oxides.

The solid acid catalyst, with a mass sulfated zirconia base mixed with a structuring refractory mineral oxide, can be prepared according to a method consisting of the following steps:
   addition of a basic solution to a solution of zirconium salt, so as to produce a precipitation of hydrated zirconia,
   addition of salt precursor solution to the structuring refractory mineral oxide
   addition of a basic solution, so as to produce a precipitation of the structuring refractory mineral oxide
   washing then drying of the product obtained
   shaping of the solid
   sulfation of the solid
   deposit of the hydrogenating transition metal
   final calcination The precipitation of the zirconia can be done before or after that of the structuring agent. The steps consisting of the deposit of the hydrogenating transition metal and the shaping can be done before or after the sulfation but must be done prior to the final calcination.

According to a fist alternative, the solid acid catalyst, with a mass sulfated zirconia base mixed with a structuring refractory mineral oxide, can be prepared according to an other method consisting of the following steps:
   addition of a basic solution to a solution of zirconium salt and of a salt precursor to the structuring refractory mineral oxide, so as to produce a co-precipitation of zirconia and of the structuring refractory mineral oxide.
   washing, drying of the precipitate obtained
   shraping of the solid
   sulfation of the solid
   deposit of the hydrogenating transition metal
   final calcination The steps consisting of the deposit of the hydrogenating transition metal and the shaping can be done before or after the sulfation but must be done prior to the final calcination.

Lastly, the solid acid catalyst, with a pure mass sulfated zirconia base can be prepared according to a method consisting of the following steps:
   addition of a basic solution to a solution of zirconium salt, so as to produce a precipitation of hydrated zirconia
   washing then drying of the precipitate obtained
   sulfation of the solid
   shaping of the solid
   deposit of the hydrogenating transition metal
   final calcination The steps consisting of the deposit of the hydrogenating transition metal and shaping can be done before or after the sulfation, but must be done prior to the final calcination.

No matter what type of catalyst is being prepared or what method of preparation is being used therefore:
   the zirconium salt can be selected from the group consisting of nitrates, chlorides, acetates, formates, zirconium oxalates and zirconyles as well as zirconium propylates and butylates
   the salts that can be used as precursors to the structuring refractory mineral oxide, if necessary, are well known to the person skilled in the art. If for example, the afore-mentioned mineral oxide is an alumina, we will use an aluminum salt that can favorably be selected from the group consisting of nitrates, chlorides and aluminum sulfates.
   the basic solution used can be any solution that will help achieve the precipitation of a hydrated oxide from a solution of salt precursor of said oxide by increasing the pH. For example, it can be that of an ainmonia solution or any other base known to the person skilled in the art.
   the step consisting of the sulfation of the catalyst is done by impregnating the solid with a sulfating agent, then drying. The sulfating agent can be liquid, gaseous or in solution; for example the following can be used, a sulfuric acid pure or in solution, an aqueous solution of ammonium sulfate, or any other precursor of sulfate ions. To achieve this sulfation, any impregnation technique known to the person skilled in the art can be used. This step usually ends by a calcination of the sulfated solid.
   the step consisting of the shaping of the invention's solid catalyst, necessary when it contains mass zirconia, makes it possible to clump the catalyst powder in the form of particles (for example beads, extrusions or pellets) in order to be able to directly use this catalyst in an industrial reactor. To facilitate this operation, it may be necessary to add a binding material (alumina xerogel or any other industrial binding material) to the catalyst powder, then to knead the mixture obtained before proceeding with the actual shaping by extrusion, "oil drop", container method, or any other method known for the shaping of industrial catalysts. This step ends with a calcination.

the step consisting of the deposit of the hydrogenating transition metal is achieved by impregnation of the solid with a solution of hydrogenating transition metal compound, followed by a drying step; when this metal is platinum, the impregnation step is carried out with a solution of a platinum compound that can be selected from the group consisting of chloroplatinic acid and complex platinum compounds.

the first calcination, usually completed after the shaping, must take place at a temperature that is sufficiently high, that is to say greater than or equal to 550° C. This is necessary in order to obtain a zirconia with an adequate crystalline structure.

The preparation methods described above are only suggestions for the preparation of a catalyst that is consistent with the invention. Of course, they have no restricted character. If necessary, the person skilled in the art will know exactly how to adapt them through additional well known operations such as, for example, the ripening of gels, washing with solvents, drying and calcination.

The invention's acid catalyst can be used in any hydrocarbon transformation chemical reaction requiring the use of an acid, or superacid, catalyst.

This catalyst has proved to be especially advantageous for isomerization reactions of linear paraffin into ramified paraffin at a temperature below 200° C., but it can just as well be used in the isomerization of olefins and the isomerization of cyclical and aromatic compounds. It can also be used in an alkylationi reaction, an oligomerization reaction or a hydrocarbon dehydration reaction.

Furthermore it can be used, quite advantageously, in a treatment method of a hydrocarbonic section containing a substantial quantity of long chain paraffin, whether linear or slightly ramified, such as for example paraffin stemming from a Fischer-Tropsch type synthesis (hydrocarbon synthesis from the $CO+H_2$ mixture). The transformation by hydrocracking or by hydroisomerization of this paraffin is often necessary in order to obtain either "large" products (medium gasolines, naphtas, or distillates) or specialties (high quality paraffin or lubricants). The operating conditions must then be adjusted in relation to the reaction that is favored (hydrocracking or hydroisomerization) and to the desired level of conversion. Preferably they will be as follows: a temperature between 20° C. and 200° C. (preferably between 50° C. and 150° C.), a pressure between $5.10^5$ and $100.10^5$ Pa (preferably between $20.10^5$ and $60.10^5$ Pa), a molecular hydrogen/hydrocarbon $H_2/HC$ ratio to be converted between 1 and 20 (preferably between 5 and 15).

The invention's catalyst can be stored or loaded in a reactor without taking any specific precautions. It is however preferable to submit it to a calcination at high temperature in a dry atmosphere before using it.

After being used, it can be regenerated by simply passing it through an oxidizing atmosphere at a temperature in the range of 400 to 700° C.

The following examples are meant to illustrate the invention. They have no restrictive character.

EXAMPLES

Preparation of Catalyst Samples Consistent with the Invention

Catalyst A

This example shows the preparation of an acid catalyst A consistent with the invention, with a supported sulfated zirconia base.

The catalyst sample is prepared from 25 g of an alumina support, marketed by AKZO under the name CK 300, previously calcined at 600° C.

The zirconium deposit is done in a ball by impregnating the support with a solution formed by the dissolution of 3.48 g of zirconyle chloride ($ZrOCl_2$, 8 $H_2O$, marketed by Prolabo) and 0.46 g of $NH_4Cl$ in 11 $cm^3$ of distilled water, with a volume corresponding to the porous volume of the support.

The solid obtained is first dried overnight at 120° C. then calcined for 2 hours at 600° C.

This operation is repeated twice (deposit of zirconium three times), then the solid obtained is calcined for 4 hours at 750° C.

Thereafter, the sulfation of the zirconium deposited on the surface of the alumina support takes place by circulating 162 $cm^3$ of a sulfuric acid solution 5 N at room temperature for 1 hour.

Then we spin-dry the solid and dry it overnight at 120° C. and then calcine it for 2 hours at 500° C. in a flow of dry air at 60 $l.h^{-1}$.

Lastly, the deposit of 0.5 percent by weight of platinum takes place: 15 $cm^3$ of a chloroplatinic acid solution at 10 $g.l^{-1}$ is mixed with 85 $cm^3$ of distilled water; this solution is mixed with the solid prepared previously, then the water is evaporated.

The solid obtained is dried overnight at 120° C. and calcined for 4 hours in a flow of dry air 45 $l.h^{-1}$ at 500° C.

Catalyst B

This example shows the preparation of an acid catalyst B consistent with the invention, with a mass sulfated zirconia base, mixed with a structuring refractory mineral oxide, in this case alumina.

A Zr solution is prepared by dissolving 23.93 g of $ZrO(NO_3)_2$, $6H_2O$ in 239 ml of distilled water with vigorous agitation.

The hydrated zirconia gel is precipitated with vigorous agitation by adding 11 ml of an ammonia solution at 28%, still with agitation. The final pH is 8.

An aluminum solution is prepared by dissolving 16.55 g of $Al(NO_3)_3$, $9H_2O$ in 50 ml of water.

This solution is poured over the zirconia gel with vigorous agitation, then 8.5 ml of ammonia at 28% is added.

After the filtration and washing until a pH 7 (redispersal in 300 ml of water), the gel is dried overnight at 120° C.

The shaping talces place after the grinding and kneading with 3.17 g of alumina marketed by CONDEA under the name Pural SB (or 20% of xerogel) and 9 ml of distilled water in an extruding syringe (2 mm diameter).

After drying overnight at 120° C., the extruded materials are calcined for 4 hours at 750° C.

The sulfation of 13.17 g of the solid is done by adding 81 ml of sulfuric acid 5 N, for 1 hour by circulation. The spinning then talces place over a Buchner funel, followed by the rinsing and drying overnight at 120° C. It ends with calcination for 2 hours at 500° C.

The quantity of recuperated material is 14.5 g.

Finally, the deposit of the platinum takes place in 10.74 g of the solid by impregnating using a rotovapor with a solution consisting of a mix of 5.37 ml of a chloroplatinic acid solution at 10 g/l of Pt and 40 ml of water.

Lastly, the solid is dried overnight at 120° C. and then calcined for 4 hours at 480° C.

Catalyst C

This example shows an alternative for the preparation of an acid catalyst C consistent with the invention, with a mass sulfated zirconia base mixed with a structuring refractory mineral oxide, in this case alumina.

A gel is prepared by dispersing 20 g of alumina Pural SB in 240 ml of water with vigorous agitation.

Then a Zr solution is prepared by dissolving 34.55 g of $ZrO(NO_3)_2$, $6H_2O$ in 350 ml of distilled water under agitation.

The last solution is added over the gel with vigorous agitation and produces the precipitation of the hydrated zirconia by adding 16.25 ml of an ammonia solution at 28%, still with agitation. The final pH is 8.5.

After a slow filtration and wash until it reaches pH 7 (redispersal in 400 ml of water), the gel is dried overnight at 120° C.

The shaping is done after the grinding and kneading of 16.1 g of the solid with 4.03 g of Pural SB type alumina (or 20% of xerogel) and 11.5 ml of distilled water in an extruding syringe (2 mm diameter).

After drying overnight at 120° C., the extruded materials are calcined for 4 hours at 750° C.

The sulfation of 14.25 g of the solid is done by adding 81 ml of a sulfuric acid 5 N by circulation during 1 hour. The spinning then takes place over a Buchner funnel, then the rinsing and the drying overnight at 120° C. It ends with the calcination for 2 hours at 500° C.

Finally, the deposit of platinum talces place by impregnating 14.5 g of this solid using a rotovapor with a solution consisting of the mixture of 7.25 ml of a chloroplatinic acid solution at 10 g/l of Pt and 30 ml of water.

Lastly, the solid is dried overnight at 120° C. and then calcined for 4 hours at 480° C.

Catalyst D

This example shows another alternative for the preparation of an acid catalyst D consistent with the invention, with a mass sulfated zirconia base mixed with a structuring refractory mineral oxide, in this case alumina.

21.11 g of $ZrO(NO_3)_2$, $6 H_2O$ and 27.58 g of $Al(NO_3)_3$, $9H_2O$ are dissolve in 400 ml of distilled water with agitation (in other words 75% of $ZrO_2$ and 25% of $Al_2O_3$ for 15 g of catalyst).

The hydroxide cogel is precipitated by adding 28.2 ml of an ammonia solution at 28%, still with agitation. The final pH is 9.

After filtration and washing until a pH of 7 (redispersal in 400 ml of water), the gel is dried overnight at 120° C.

The shaping is done after the grinding of the whole solid and mixing with 3.33 g of Pural SB type alumina (in other words 20% of xerogel) and 8.75 ml of distilled water in an extruding syringe (2 mm diameter).

After drying overnight at 120° C. the extruded materials are calcined for 4 hours at 750° C.

The sulfation of 11.33 g of the solid is done by adding 75 ml of a sulfuric acid 5 N by circulation for 1 hour. The spinning then takes place over a Buchner funnel, then the rinsing and drying take place overnight at 120° C. It ends with a calcination for 2 hours at 500° C.

Finally the deposit of platinum is done by impregnating 11.22 g of this solid using a rotovapor with a solution consisting of a mixture of 4.6 ml of a chloroplatinic acid solution at 10 g/l of Pt and 40 ml of distilled water.

Lastly, the solid is dried overnight at 120° C. and then calcined for 4 hours at 480° C.

Catalyst E

This example shows the preparation of an acid catalyst consistent with the invention, with a pure mass sulfated zirconia base.

35 g of $ZrOCNO_3)_2$, $6H_2O$ is dissolved in 350 ml of distilled water with agitation.

The zirconium hydroxide gel is precipitated by adding 17 ml of an ammonia solution at 28%, still with agitation. The final pH is 8.5.

After filtering and washing until a pH 7 (redispersal in 350 ml of water), the gel is dried overnight at 120° C.

The result is 13.77 g of solid.

The sulfation is done by adding 85 ml of sulfuric acid 1 N, by static contact for 15 minutes. The spinning then takes place over a Buchner funnel, then the drying is done overnight at 120° C.

The shaping is done after the grinding of the whole solid and the mixing with 3.4 g of Pural SB type alumina and 6.9 ml of distilled water in an extruding syringe (2 mm diameter).

After drying again overnight at 120° C., the extruded materials are calcined for 2 hours at 625° C.

The quantity of recuperated material is 12.5 g.

Finally, the deposit of platinum takes place by impregnating in static 12.3 g of this solid with a solution consisting of the mixture of 0.248 g of a chloroplatinic acid at 25% of Pt and 3.8 ml of distilled water (impregnation at porous volume).

Lastly, the solid is dried overnight at 120° C. and then calcined for 4 hours at 480° C.

Properties and Activity of the Catalyst Sample

Table 1 hereafter shows the properties of the catalyst samples obtained according to the methods of preparation described above.

In these five samples, the sulfated zirconia shows a quadratic type crystalline structure. This structure has been determined by x-ray diffraction.

In the following table, S, Vp and Rp respectively designate the surface area, the pore volume and the average pore diameter of the catalyst. These characteristics have been determined using the B.E.T. method (Brunauer, Emmett, Teller), by adsorption of nitrogen, as described in the work by S. Lowell and J. E. Shields, "Powder Surface Area and Porosity", Powder Technology Series (1984). The specific surface area S is deducted form the BET linear transformation at five points (at the relative pressures P/Po=0.045; 0.08; 0.15; 0.25 and 0.33), the pore volume Vp is determined according to the quantity of nitrogen adsorbed at P/Po=0.985 and the average pore diameter Rp is calculated using the formula Rp=2Vp/S.

Before determining these characteristics, the sample was subjected to a pretreatment by primary vacuum duration at 250° C. For at least 8 hours.

TABLE 1

| Catalyst | $ZrO_2$ (% by weight) | $Al_2O_3$ (% by weight) | S ($m^2/g$) | Vp ($cm^3/g$) | Rp ($10^{-10}$m) | Sulfur content (%) |
|---|---|---|---|---|---|---|
| A | 17.6 | 82.4 | 151 | 0.34 | 55 | 2.8 |
| B | 71 | 29 | 158.1 | 0.32 | 41 | 3.4 |
| C | 50 | 50 | 151.4 | 0.37 | 49 | 3.6 |
| D | 62.5 | 37.5 | 152.5 | 0.25 | 33 | 3.6 |
| E | 80 | 20 | 140 | 0.16 | 23 | 1.9 |

Note: Catalyst E has a pure mass sulfated zirconia base, the 20% of alumina corresponds to the bond added during the shaping stage of the solid catalyst.

The results given above show that the preparation methods perfected by the applicant make it possible to create catalysts with a sulfated zirconia base that have surface areas especially high, greater than what has been done to date in the prior art. Thanks to such methods, it is now possible to control the porosity of these catalysts and to modify it in order to obtain the desired activity.

The activity of these samples was first determined in the isomerization reaction of the normal hexane, in conditions that are usually used for chlorine catalysts (T=145° C., P=30.10$^5$ Pa, hydrogen/hydrocarbon H$_2$HC ratio=3). Table II hereafter gives the results obtained. The activity of the samples is represented by the percentage by weight of 2.2 dimethyl butane (2.2 DMB) in the isomerization effluent of the normal hexane. Various spatial speeds (or ppH, load weight per unit of catalyst weight and per hour) were used: ppH 2 or 4 kg of load.kg$^{-1}$ of catalyst. h$^{-1}$.

Thus, catalyst E has been tested for the hydroconversion of the normal-hexane on the one hand and the normal-hexadecane on the other hand.

For each catalytic test, 7 g of catalyst were loaded in a reactor in anhydrous conditions (in argon atmosphere). Different operational conditions were used where T represents the temperature, P the pressure, H$_2$/HC the hydrogen/hydrocarbon molecular ratio, pph the weight of the load per weight unit of the catalyst and per hour.

The results obtained are given in Tables III and IV hereafter.

TABLE III hydroconversion of the n-dodecane (n-C12)

| T (° C.) | P (10$^5$ Pa) | H$_2$/HC | PPH h$^{-1}$ | Conversion (%) | Performance i-C12 (%) | Performance C5–C11 (%) | Selectivity i-C12 (%) | Selectivity C5–C11 (%) |
|---|---|---|---|---|---|---|---|---|
| 150 | 50 | 6 | 0.84 | 100 | 0 | 44.2 | 0 | 44.2 |
| 125 | 50 | 12 | 1.25 | 60 | 8 | 40.1 | 13.3 | 67.9 |
| 125 | 50 | 12 | 1.25 | 91.2 | 2.2 | 61 | 2.4 | 66.9 |
| 115 | 50 | 6 | 0.84 | 69.6 | 6.3 | 46.6 | 9.2 | 67 |
| 115 | 50 | 12 | 1.25 | 51.6 | 6.7 | 35.4 | 13 | 68.6 |
| 115 | 30 | 6 | 0.84 | 70.4 | 0.7 | 26.2 | 1 | 37.2 |

TABLE IV hydroconversion of the n-hexadecane (n-C16)

| T (° C.) | P (10$^5$ Pa) | H$_2$/HC | PPH h$^{-1}$ | Conversion (%) | Selectivity i-C16 (%) | Selectivity C5–C11 (%) | Selectivity C12–C15 (%) |
|---|---|---|---|---|---|---|---|
| 115 | 50 | 3 | 1 | 100 | 0 | 71.7 | 0.3 |
| 115 | 50 | 3 | 2 | 57.4 | 8.3 | 59.5 | 6.6 |
| 115 | 50 | 6 | 2 | 53.2 | 9.1 | 54.1 | 7.1 |
| 115 | 50 | 6 | 1 | 78.6 | 5.7 | 73.4 | 3.7 |
| 115 | 50 | 1.22 | 1 | 100 | 0 | 85.6 | 0.7 |
| 125 | 50 | 6 | 2 | 56 | 6.5 | 72.3 | 5.4 |
| 125 | 50 | 3 | 2 | 69.8 | 6.1 | 71.7 | 3.6 |

TABLE II isomerization of the normal-hexane

| | Activity (% 2.2 = DMB) | |
|---|---|---|
| Catalyst | ppH = 2 | ppH = 4 |
| A | 29.9 | 21.2 |
| B | 31.4 | 27.9 |
| C | 31.9 | 28.2 |
| D | 29.6 | 22.1 |
| E | 26.4 | |

Thus, the catalysts consistent with the invention show excellent activity for the isomerization of light paraffin at low temperature. This activity is close to that of the traditional catalysts with a chloride alumina base.

Furthermore, the additional properties brought by the invention's catalysts, in relation to the catalysts in the prior art, are quite considerable (increased stability, ease of handling, regenerability, etc.) All this makes their use particularly advantageous in reactions involving an acid, or superacid, catalyst.

Note that the activity of catalysts consistent with the invention are also quite remarkable in other reactions, in particular the hydroconversion of heavier, linear or slightly ramified paraffins.

As shown in the above tables, the conversion is important starting at 115° C., which shows the high activity of the catalyst at low temperatures.

Two reactions really take place:

hydroisomerization of the normal-dodecane into iso-dodecane (n-C12→i-C12), or of the normal hexadecane into iso-hexadecane (n-C16→i-C16);

hydrocracking of the normal-dodecane or the normal-hexadecane into lighter hydrocarbons, with each time an excellent selectivity in favor of the intermediary hydrocarbons containing 5 to 11 carbon atoms (more that 85% in certain conditions); they are mostly ramified pentanes and hexanes (C5 and C6) which are sought products as they reusable to benefication in gases due to their high octane number; thus, the C5–C6 fraction produced by the hydroconversion of the normal-hexadecane at 115° C., 50.10$^5$ Pa, H$_2$/HC=6 and pph=1 (Table IV, line 4, in bold) presents a researched octane number, or RON, equal to 88.

The catalyst consistent with the invention is therefore particularly performing for the hydroconversion of slightly ramified paraffin with more than 7 carbon atoms, such as paraffin produced by a Fischer-Tropsch type synthesis. It has proved to be remarkably selective regarding the hydrocracking of these paraffins into intermediary hydrocarbons amenable to benefication.

What is claimed is:

1. A solid acid catalyst, comprising supported sulfated zirconia and at least one hydrogenating transition metal, wherein the sulfated zirconia is in crystallized form and is deposited on a support selected from the group consisting of alumina, silica, silica-alumina, silicalite, alumino-silicate, magnesia, zeolite, active carbon, gallium, titanium, thorium, boron oxide, clays and combinations thereof and the catalyst has a surface area greater than or equal to 135 m$^2$/g, a pore volume greater than or equal to 0.16 cm$^3$/g and an average pore diameter greater than or equal to $20 \times 10^{-1}$ m.

2. The solid acid catalyst as set forth in claim 1, wherein the surface area is greater than or equal to 150 m$^2$/g, the pore volume is greater than or equal to 0.2 cm$^3$/g, and the average pore diameter is greater than or equal to $30 \times 10^{-10}$ m.

3. The solid acid catalyst as set forth in claim 1, wherein said crystallized sulfated zirconia has a quadratic or monoclinic crystalline structure.

4. The solid acid catalyst as set forth in claim 1, wherein the catalyst has an apparent filling density between 0.5 and 3.

5. The solid acid catalyst as set forth in claim 1, wherein said zirconia is partially sulfated and the sulfated zirconia has a sulfur content in the form of sulfate between 1% and 10% by weight based on the weight of the zirconia.

6. The solid acid catalyst as set forth in claim 1, wherein 5 to 50 percent by weight of sulfated zirconia is deposited on between 50 and 95 percent by weight of said support, based on a total weight of said solid acid catalyst.

7. The solid acid catalyst as set forth in claim 1, wherein the hydrogenating transition metal is an element of Group VIII of the Periodic table of elements.

8. A method of making a solid acid catalyst, with a crystallized sulfated zirconia base, deposited on a catalytic support, comprising the steps of:
   a) depositing a hydrated zirconia on the catalytic support to form a solid,
   b) first calcining the solid at a temperature of at least 550° C.,
   c) sulfating the solid,
   d) depositing a hydrogenating transition metal on the solid,
   e) final calcining the solid.

9. The method as set forth in claim 8, wherein step a) comprises impregnating the support with a zirconium salt solution followed by drying the solid.

10. The method as set forth in claim 9, wherein the zirconium salt is chosen from the group consisting of zirconium and zirconyle nitrates, chlorides, acetates, formates, oxalates, zirconium propylates and butylates.

11. The method as set forth in claim 8, wherein step c) comprises impregnating the solid with a sulfating agent drying, and calcining the solid wherein the sulfating agent is either pure sulfuric acid or a solution of sulfuric acid, an ammonia sulfate aqueous solution, or another precursor of sulfate ions.

12. The method as set forth in claim 8, wherein step d) comprises impregnating the solid with a solution of a compound of the hydrogenating transition metal, followed by a drying step.

13. The method as set forth in claim 12, wherein the hydrogenating transition metal is platinum, and said impregnating step is with a solution of a platinum compound selected from the group consisting of chloroplatinic acid and complex compounds of platinum.

14. The solid acid catalyst according to claim 5, wherein the sulfur content in the form of sulfate is between 1% and 5% based upon the weight of the zirconia.

15. The solid acid catalyst according to claim 1, wherein the zirconia is totally sulfated.

16. The solid acid catalyst according to claim 1, wherein the hydrogenating transition metal is platinum.

17. A solid acid catalyst, comprising crystallized sulfated zirconia in mass form and at least one hydrogenating transition metal, wherein the crystallized sulfated zirconia, is mixed with a refractory mineral oxide, and the catalyst has a surface area greater than or equal to 135 m$^2$/g, a pore volume greater than or equal to 0.16 cm$^3$/g and an average pore diameter greater than or equal to $20 \times 10^{-10}$ m.

18. The solid acid catalyst as set forth in claim 17, wherein the surface area is greater than or equal to 150 m$^2$/g, the pore volume is greater than or equal to 0.2 cm$^3$/g, and the average pore diameter is greater than or equal to $30 \times 10^{-10}$ m.

19. The solid acid catalyst as set forth in claim 17, wherein said crystallized sulfated zirconia has a quadratic or monoclinic crystalline structure.

20. The solid acid catalyst as set forth in claim 17, wherein the catalyst has an apparent filling density between 0.5 and 3.

21. The solid acid catalyst as set forth in claim 17, wherein said zirconia is partially sulfated and the sulfated zirconia has a sulfur content in the form of sulfate between 1% and 10% by weight based on the weight of the zirconia.

22. The solid acid catalyst as set forth in claim 17, wherein said refractory mineral oxide is selected from the group consisting of aluminas, silicas, silica-aluminas, alumino-silicates, clays and combinations thereof.

23. The solid acid catalyst as set forth in claim 17, containing from 0.5 to 100 percent by weight of sulfated zirconia.

24. The solid acid catalyst as set forth in claim 17, wherein the hydrogenating transition metal is an element of Group VIII of the Periodic table of elements.

25. A method of preparing a solid acid catalyst, with a mass crystallized sulfated zirconia base mixed with a structuring refractory mineral oxide, comprising the steps of:
   a) adding a basic solution to a zirconium salt solution to produce a precipitation of hydrated zirconia
   b) adding a solution of salt precursor of the structuring refractory mineral oxide,
   c) adding a basic solution to produce a precipitation of the structuring refractory mineral oxide,
   d) washing then drying the product to form a solid,
   e) shaping the solid and first calcining at a temperature of at least 550° C.
   f) sulfating the solid,
   g) depositing a hydrogenating transition metal,
   h) final calcining,
wherein step a) can be done before step b) or after step c), and wherein steps e) and g) are before or after step f), but are prior to step h).

26. A method of making a solid acid catalyst, having a mass crystallized sulfated zirconia base mixed with a structuring refractory mineral oxide, comprising the steps of:
   a) adding a basic solution to a solution of a zirconium salt and a salt of a precursor of the structuring refractory mineral oxide to produce a co-precipitation of zirconia and of the structuring refractory mineral oxide,
   b) washing and drying the precipitate to form a solid,
   c) shaping the solid, and first calcining at a temperature of at least 550° C.
   d) sulfating the solid,
   e) depositing the hydrogenating transition metal, and
   f) final calcining
wherein the steps c) and e) are before or after step d), but are prior to step f).

27. The method as set forth in claim 25, wherein said structuring mineral oxide is alumina and said precursory salt is chosen from the group consisting of nitrates, chlorides and sulfates of aluminum.

28. The method as set forth in claim 26, wherein said structuring mineral oxide is alumina and said precursory salt is chosen from the group consisting of nitrates, chlorides and sulfates of aluminum.

29. The method as set forth in claim 25, wherein the zirconium salt is chosen from the group consisting of zirconium or zirconyle nitrates, chlorides, acetates, formates, oxalates, zirconium propylates and butylates.

30. The method as set forth in claim 26, wherein the zirconium salt is chosen from the group consisting of zirconium or zirconyle nitrates, chlorides, acetates, formates, oxalates, zirconium propylates and butylates.

31. The method as set forth in claim 25, wherein step f) comprises impregnating the solid with a sulfating agent, drying, and calcining the solid wherein the sulfating agent is either pure sulfuric acid or a solution of sulfuric acid, an ammonia sulfate aqueous solution, or another precursor of sulfate ions.

32. The method as set forth in claim 26, wherein step d) comprises impregnating the solid with a sulfating agent, drying, and calcining the solid wherein the sulfating agent is either pure sulfuric acid or a solution of sulfuric acid, an ammonia sulfate aqueous solution, or another precursor of sulfate ions.

33. The method as set forth in claim 25, wherein step g) comprises impregnating the solid with a solution of a compound of the hydrogenating transition metal, followed by a drying step.

34. The method as set forth in claim 26, wherein step e) comprises impregnating the solid with a solution of a compound of the hydrogenating transition metal, followed by a drying step.

35. The method as set forth in claim 34, wherein the hydrogenating transition metal is platinum, and said impregnating step is done with a solution of a platinum compound selected from the group consisting of chloroplatinic acid and complex compounds of platinum.

36. The method as set forth in claim 34, wherein the hydrogenating transition metal is platinum, and said impregnating step is done with a solution of a platinum compound selected from the group consisting of chloroplatinic acid and complex compounds of platinum.

37. The solid acid catalyst according to claim 21, wherein the zirconia is partially sulfated and the sulfur content in the form of sulfate is between 1% and 5% based upon the weight of the zirconia.

38. The solid acid catalyst according to claim 17, wherein the zirconia is totally sulfated.

39. The solid catalyst according to claim 17, containing from 20 to 80 percent by weight of sulfated zirconia, based on the total weight of the catalyst.

40. The solid acid catalyst according to claim 17, wherein the hydrogenating transition metal is platinum.

* * * * *

UNITED STATES PATENT AND TRADEMARK OFFICE
CERTIFICATE OF CORRECTION

PATENT NO.    : 6,180,555 B1
DATED         : January 30, 2001
INVENTOR(S)   : Georges Szabo et al.

It is certified that error appears in the above-identified patent and that said Letters Patent is hereby corrected as shown below:

<u>Column 11,</u>
Table II, delete and insert the following new Table:

TABLE II

| Catalyst | isomerization of the normal-hexane Activity (%2.2=DMB) | |
|---|---|---|
| | ppH=2 | ppH-4 |
| A | 29.9 | 21.2 |
| B | 31.4 | 27.9 |
| C | 31.9 | 28.2 |
| D | 29.6 | 22.1 |
| E | 30.7 | 26.4 |

Signed and Sealed this

Thirty-first Day of December, 2002

JAMES E. ROGAN
*Director of the United States Patent and Trademark Office*